United States Patent [19]

Barsotti et al.

[11] Patent Number: 4,509,007
[45] Date of Patent: Apr. 2, 1985

[54] DIFFERENTIAL SENSOR MEASURING APPARATUS AND METHOD INCLUDING SENSOR COMPENSATOR CIRCUITRY

[75] Inventors: Rudolf H. Barsotti; Arthur W. Grove, both of Tucson, Ariz.

[73] Assignee: IBM Corporation, Armonk, N.Y.

[21] Appl. No.: 429,726

[22] Filed: Sep. 30, 1982

[51] Int. Cl.³ ..................... G01R 11/52; G01R 27/26
[52] U.S. Cl. .................................. 324/60 C; 242/184; 340/870.37; 360/71; 364/571
[58] Field of Search ........................... 324/60 C, 61 R; 364/571, 482; 360/71, 93, 74.5; 242/184, 188, 75.51; 340/870.37

[56] References Cited

U.S. PATENT DOCUMENTS

| | | | |
|---|---|---|---|
| 4,001,813 | 1/1977 | Kosakowski | 324/60 C X |
| 4,165,483 | 8/1979 | Holdren et al. | 324/60 C |
| 4,167,697 | 9/1979 | Gerber | 324/60 C |

Primary Examiner—Stanley T. Krawczewicz
Attorney, Agent, or Firm—Pollock, Vande Sande & Priddy

[57] ABSTRACT

Apparatus and method for measuring the signals from a transducer. The signals are processed to form a differential component normalized by a summation component such that common changes to the sensors response characteristic are compensated. The sensors performance at the limits of the sensing range is also improved by the summation signal.

8 Claims, 2 Drawing Figures

DIFFERENTIAL SENSOR MEASURING APPARATUS AND METHOD INCLUDING SENSOR COMPENSATOR CIRCUITRY

The present invention relates to apparatus and method for measuring signals provided by differential sensors. Specifically, apparatus and method are provided for measuring signals from a differential transducer which compensates the measurement for changes which occur in the transducer's response characteristic.

Differential transducers which respond to a sensed condition to produce first and second differential voltages are known in the art. The use of differential voltages to represent the sensed condition results in improved accuracy of measurement.

In the computer art magnetic tape memory storage techniques require the sensing of a tape condition in order to control the supply of magnetic tape. A capacitive transducer which senses tape position within a vacuum column has been successfully implemented to control the magnetic tape feed. The vacuum column serves as a buffer to store the magnetic tape temporarily and a sluggish reel motor will catch up with a more agile capstan motor. The capacitive position sensor provides a control signal to the reel motor and excessive magnetic tape in the vacuum column will be removed. The capacitive transducers exhibit a differential capacitance change as a function of the tape position in a column. As occurs with many capacitive-reactive transducers, the response characteristic may change due to normal component aging. Changes in the response characteristic will in the case of computer magnetic tape drive systems result in an improper magnetic tape feed as the position will be incorrectly sensed.

The above problem of response characteristic changes with time are common to many transducers which rely on capacitive or other electrical parameter changes as an indication of sensed condition. The present invention is particularly suited for use in magnetic tape drive systems for correcting position transducer measurements but can be used with many other transducer applications.

SUMMARY OF INVENTION

It is an object of this invention to provide compensation to transducer produced measurements which compensates for changes in the transducer response characteristic.

It is a more particular object of the invention to provide electrical compensation to a capacitive differential transducer circuit which senses the position of a magnetic tape in a vacuum column.

These and other objects are provided by apparatus and methods in accordance with the invention. A signal is developed from a transducer which represents a sensed condition. The resulting signal also provides a feedback signal which is supplied to the transducer. The feedback signal is arranged to have a magnitude and sense which compensates for the changes in the response characteristic of the transducer.

In a preferred embodiment of the invention, compensation is provided to a differential capacitive transducer which senses the position of magnetic tape in a vacuum column. The transducer is driven with alternating current and differential output signals are provided which have a magnitude proportional to the differential capacity of the transducer.

The differential signals are combined to provide an inverse summation signal. The summation signal is added to the input drive alternating current to provide a change in the operating point of the transducer response curve. The result is a logical product of the differential output signals with the inverse of the summation signal. Thus, common changes in the differential signals are compensated by the normalizing summation signal.

DESCRIPTION OF THE PREFERRED EMBODIMENT

Figures 1, 2:
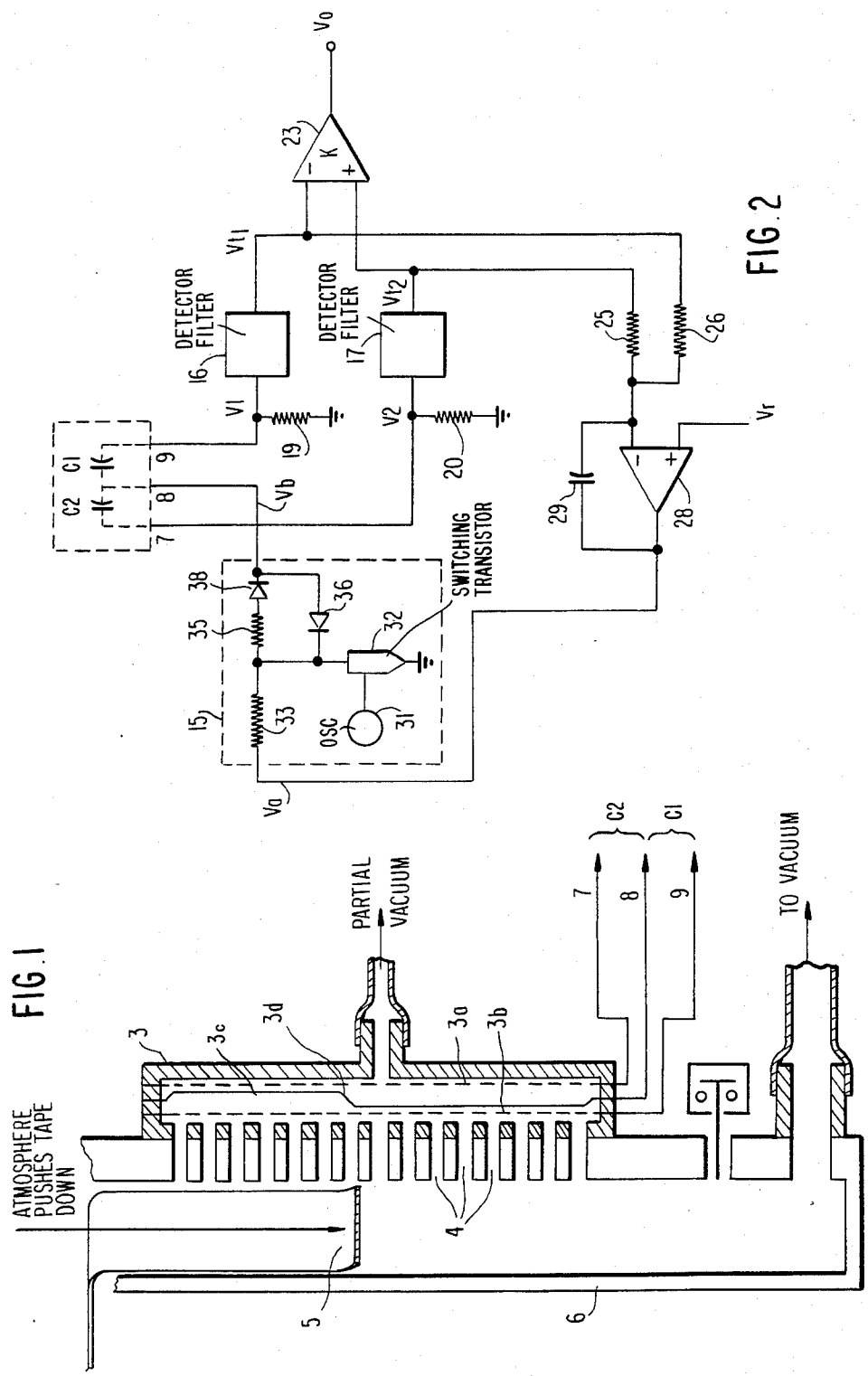
FIG. 1 is an illustration of a differential capacitive transducer arranged to sense the position of magnetic tape in a vacuum column.
FIG. 2 is an schematic drawing of a circuit for providing a compensated measurement signal from the transducer of FIG. 1.

Referring now to FIG. 1, there is shown a vacuum column 6 for receiving a loop of magnetic tape 5 for a magnetic tape reel drive system. The tape 5 is adjacent a plurality of sensing ports 4. The vacuum on the underside of tape loop 5 tends to pull the loop towards the bottom of the column 6.

The transducer housing 3 is under a partial vacuum. The metal diaphragm 3c receives a biasing force from the partial vacuum. The sensing ports 4 provide an opposite force against the diaphragm 3c. First and second electrodes 3a, 3b are located on each side of the diaphragm 3c. The diaphragm 3c has a wrinkle 3d which changes positions as the length of the tape loop 5 changes. The tape loop 5 obstructs a number of sensor ports 4. As the tape loop 5 moves downward in column 6, the wrinkle 3d in diaphragm 3c also moves downward. The electrodes 3a and 3b form first and second capacitors with metal diaphragm 3c. The capacitance between the electrodes 3a, 3b, and metal diaphragm 3c is sensed at terminals 7, 9 and 8. The sensed capacitance provides an indication of the position of the tape loops in the column 6, as the wrinkle of diaphragm 3c moves changing the sensed capacity. A drive signal is formed from the sensed capacitance signal for correcting the drive reel speed to avoid an excessive length of tape loop 5.

The circuit for driving capacitor elements C1 and C2 formed by the electrodes 3a, 3b and diaphragm 3c is shown in FIG. 2. The signal for driving the capacitor elements C1, C2 originates from an oscillator 15 selected to have a frequency at least twice the R-C time constant of the load presented by elements C1 and C2 and terminating impedances, resistors 19 and 20, which is typically 3K Hz. Oscillator circuit 15 comprises an oscillator 31 connected to gate switching transistor 32 on and off. The square wave output signal from switching transistor 32 is applied through the parallel combination of diode 38 serially connected to resistor 38, and diode 36, reverse to diode 35. An inverse summation signal Va is combined with the switching transistor 32 output signal such that the D.C. bias component of Vb moves as Va changes. Resistor 33 is made equivalent to resistor 35 whereby the impedance presented to the capacitor sensor $C_1$, $C_2$ during the on and off times of transistor 32 remains substantially the same.

The average voltage potential V1, V2 is under these conditions approximately proportional to the capacitances C1, C2.

$V_1 \alpha C_2$ $V_2 \alpha C_2$

Detector-filters 16, 17 convert the alternating signals from capacitors C1, C2 to a d.c. voltage level $Vt_1$ and $Vt_2$ which are also substantially proportional to C1 and C2. The output voltage from differential amplifier 23 is $K(Vt_1 - Vt_2)$ A summation signal $Vt_1 + Vt_2$ is formed from the voltage levels $Vt_1$ and $Vt_2$, to form a signal $(Vt_1 + Vt_2)/2$, where resistors 25 and 26 are substantially equivalent. The resulting signal is inverted by amplifier 28. A reference voltage which is selected to be with in the range of $(Vt_1 + Vt_2)/2$ is connected to the noninverting input of amplifier 28. Capacitor 29 provides for a frequency roll off of the signal $(Vt_1 + Vt_2)/2$ which prevents the circuit from oscillating.

The feedback voltage from amplifier 28 controls the oscillator 15 and output voltage Vb so that $(Vt_1 + Vt_2)/2$ is maintained at substantially Vr. The voltages $Vt_1$ and $Vt_2$ are related to the input voltage Vb as $$Vt_1 = C_1 Vb \tag{1}$$

$$Vt_2 = C_2 Vb \tag{2}$$

where Vb is the oscillator 15 output voltage, $C_1$ and $C_2$ are the differential capacitances of the respective sensor 3. The steady state condition is represented as $$Vr = (Vt_1 + Vt_2)/2 \tag{3}$$

The output voltage Vo of the device may be represented by $$Vo = K(Vt_1 - Vt_2), \tag{4}$$

where K is the gain of differential amplifier 23.

Substituting equations (1) and (2) into (3) and (4), and then dividing (4) by (3), the following results:

$$V_0 = 2 \cdot K Vr (C_1 - C_2)/(C_1 + C_2) \tag{5}$$

The differential component $(C_1 - C_2)$ is therefore seen to be normalized by the summation component $(C_1 + C_2)$. Changes in the values of $C_1$, $C_2$ due to aging which produce common variations will therefore be compensated by the summation component $(C_1 + C_2)$. The bias signal Va therefore inversely shifts the a.c. signal Vb to compensate for changes in mutual changes in $C_1$, $C_2$. The aging effects ultimately result in operating the transducer along a different portion of its response curve due to the feedback signal. An additional benefit is obtained using the above technique with transducers which have a 0 level output signal at one end of the transducer range. In this extreme range condition of a differential transducer, where $C_1 \gg C_2$, or $C_2 \gg C_1$, the output voltage Vo assumes one of 2KVr, −2KVr.

The accuracy of the transducer at the end limits is improved regardless of common mode or singular variation in the transfer characteristic of the differential transducer. The end points therefore never change from the constant magnitude 2KVR and the sensor signal remains between these two levels.

Thus, there has been described a differential transducer measuring apparatus which provides a measurement which includes compensation for the transducer response changes. Those skilled in the art will recognize other embodiments defined more particularly by the claims which follow.

Technical Improvement

Sensor measuring apparatus and method which compensates for changes in the sensor response over time and improves measurement accuracy at the limits of the sensor.

What is claimed is:

1. In a measuring system wherein first and second differential voltages $V_1$, $V_2$ are produced from a sensor for indicating the value of a sensed condition, apparatus for compensating changes in the response of said sensors comprising:
    means for summing said first and second differential voltages to provide a composite correction signal of $V_1 + V_2$;
    means for multiplying each of said differential voltages by the reciprocal of $V_1 + V_2$ whereby first and second weighted voltages are produced.

2. The apparatus of claim 1 further comprising means for subtracting said first and second differential voltages $V_1$, $V_2$ whereby a measurement signal is produced.

3. In a system for providing differential signals for indicating a sensed condition from a pair of sensors, each of said sensors having a response characteristic which changes over time, a circuit compensating for said changes comprising:
    biasing means for applying a bias signal to said sensors for weighting said response characteristic;
    combining means for forming a summation signal from said differential signals; and
    means for applying said summation signal to said biasing means whereby said differential signals are weighted by the composite changes in response to said sensors.

4. In a measuring system including first and second capacitor sensing means, each having a common side receiving a signal, and a pair of remaining sides producing a signal voltage $V_1$ and $V_2$, apparatus compensating for changes in said capacitor sensing means response characteristic comprising:
    means for rectifying each of said signal voltages to produce first and second d.c. signal voltages;
    means for applying the summation of said dc signal voltages to said capacitor common sides whereby said capacitor is biased at a level proportional to the reciprocal of $V_1 + V_2$, compensating for any common changes in said response characteristic.

5. The apparatus of claim 4 wherein said means for applying the summation of said first and second d.c. voltages comprises:
    first and second resistors having first ends connected to receive one of said d.c. voltages, and remaining second ends; and
    a differential amplifier having an inverting input connected to said remaining second ends and a noninverting input connected to a reference voltage whereby a summation signal is produced from said first and second d.c. voltages and said reference voltage.

6. The apparatus of claim 4 further comprising:
a differential amplifier for combining said d.c. signal voltages to produce an output voltage.

7. A method for compensating first and second sensors having a capacity which varies in accordance with a sensed condition, said sensors having a common connection to a source of a.c. signals, and first and second signal supplying connections comprising;

rectifying first and second signals from said first and second signal supplying connections, whereby first and second d.c. voltage are produced;

combining said first and second d.c. voltages to provide a bias signal; and applying said bias signal to said common connection whereby a composite signal voltage is applied to each of said sensors for weighting said response characteristic.

8. The method of claim 7 further including the step of inverting said bias signal.

* * * * *

UNITED STATES PATENT AND TRADEMARK OFFICE
CERTIFICATE OF CORRECTION

PATENT NO. : 4,509,007
DATED : April 2, 1985
INVENTOR(S) : Barsotti et al

It is certified that error appears in the above-identified patent and that said Letters Patent are hereby corrected as shown below:

In column 3, line 35 Vr=(t1+Vt2)/2 should read

--Vr = (Vt1+Vt2)/2 --.

Signed and Sealed this

Sixth Day of August 1985

[SEAL]

*Attest:*

DONALD J. QUIGG

*Attesting Officer*  *Acting Commissioner of Patents and Trademarks*